July 22, 1952
F. LONG
2,604,234
FERTILIZER DISTRIBUTOR
Filed April 4, 1947
2 SHEETS—SHEET 1
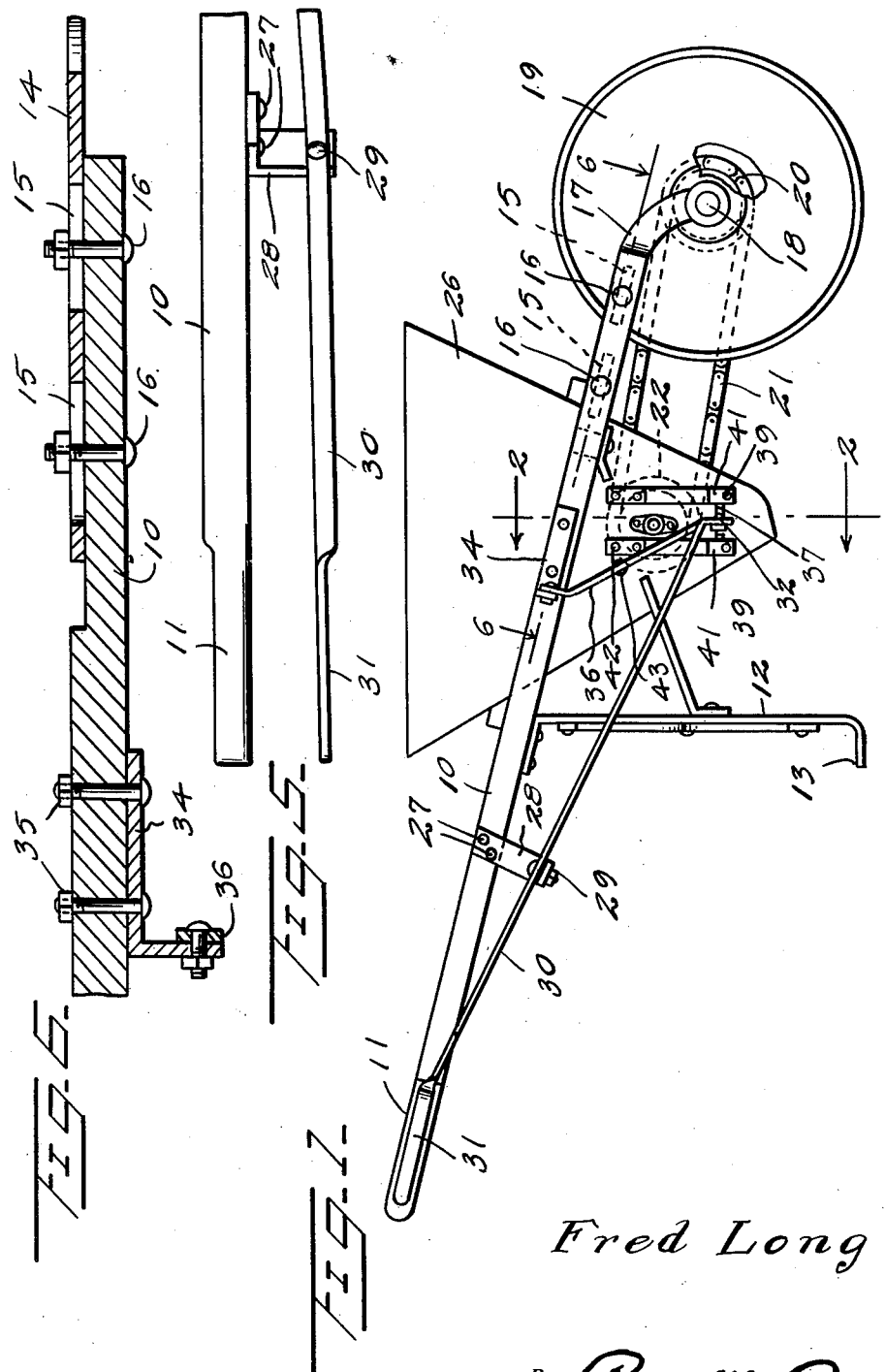
Inventor
*Fred Long*
By *Randolph & Beavers*
Attorneys July 22, 1952  F. LONG  2,604,234
FERTILIZER DISTRIBUTOR
Filed April 4, 1947  2 SHEETS—SHEET 2
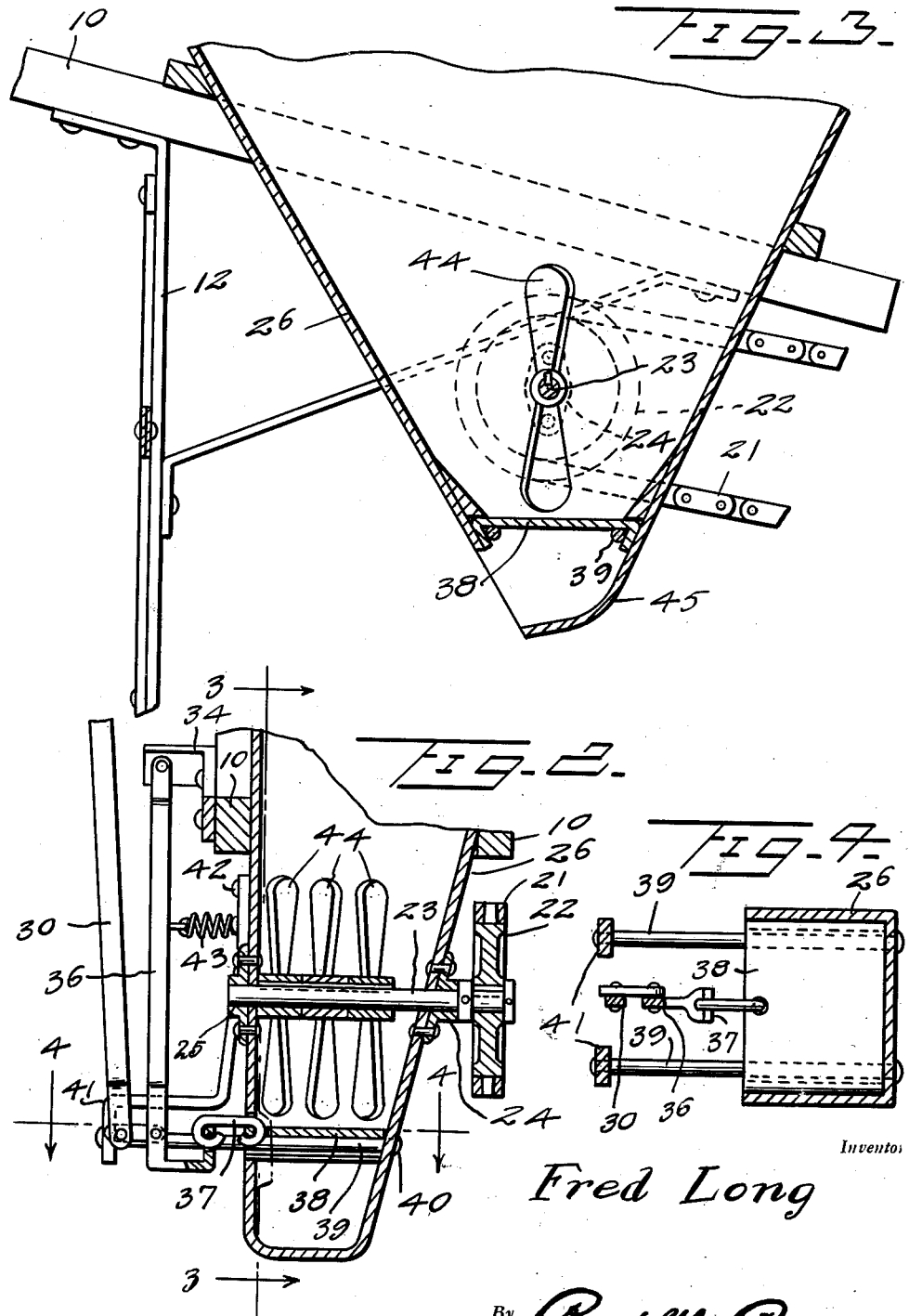
Inventor
Fred Long
By Randolph & Beavers
Attorneys Patented July 22, 1952

2,604,234

UNITED STATES PATENT OFFICE 2,604,234

FERTILIZER DISTRIBUTOR

Fred Long, Saltillo, Miss.

Application April 4, 1947, Serial No. 739,412

1 Claim. (Cl. 222—177)

The present invention relates to fertilizer distributors and it consists in the combinations, constructions and arrangements of parts herein described and claimed.

Generally the invention comprises a wheelbarrow-like structure having the customary handles, a wheel, a pair of legs and a hopper. The wheel is adapted to impart motion through a chain and gears to an impeller mounted within the hopper and there is provided a distributing spout provided with a valve which is adapted to be operated by a lever placed conveniently to the operator's fingers and which valve is normally closed by a spring.

It is accordingly an object of the invention to provide a fertilizer distributor which is simple in construction, inexpensive to manufacture and efficient in its operation.

A further object of the invention is the provision in a device of this character above referred to of an automatic cut-off valve.

A further object of the invention is the provision of manually operated means for opening a cut-off valve and an automatic means for closing the same in a device of the character described.

A further object of the invention is the provision, in a device of this character, of novel means for imparting motion to an impeller or agitator mounted in a hopper of a wheelbarrow type fertilizer distributor.

A further object of the invention is the provision of novel means for mounting a cut-off valve for a hopper.

Other and further objects of the invention will become apparent from a reading of the following specification taken in conjunction with the drawings, in which:

Figure 1 is a vertical elevational view of an embodiment of the invention,

Figure 2 is an enlarged sectional view taken substantially along line 2—2 of Figure 1, Figure 3 is a sectional view taken along line 3—3 of Figure 2, Figure 4 is a sectional view taken along line 4—4 of Figure 2, Figure 5 is a fragmentary plan view disclosing certain details of the invention, and Figure 6 is an enlarged sectional view taken along line 6—6 of Figure 1.

Referring more particularly to the drawings, there is shown therein a fertilizer distributor having a pair of shafts 10 having the customary handles 11 formed integrally therewith and a pair of legs 12 provided with feet 13 depending from the shafts 10 in the customary manner.

It will be noted that but one of the devices 10, 11, 12 and 13 is shown in Figure 1, but it will be understood that there are two of each of these devices provided in the ordinary and conventional manner of a wheelbarrow.

Adjustably mounted at the lower extremities of the shafts 10 by means of a plate 14 having slots 15 provided therein for the reception of bolts 16 is a yoke 17 to which is journaled, as indicated at 18, a wheel 19.

The wheel 19 has attached thereto in any conventional manner a sprocket wheel 20 about which is engaged a chain 21 which extends rearwardly and is trained about a sprocket wheel 22 carried by a shaft 23 which is journaled as indicated at 24 and 25 in the lower end of a hopper 26 which is supported, in turn, by the shafts 10.

Bolted, as indicated at 27 to one of the shafts 10 is a bracket 28 to which is pivoted, as indicated at 29, an elongated lever 30 which is provided with an operating handle 31 adjacent to one of the handles 11 and which is provided at its other end with a dog 32. A bracket 34 is affixed to the shaft 10 to which is affixed the bracket 28 and is held in position by means of bolts 35. A link 36 interconnects the bracket 34 at its upper end and a short horizontally extending link 37 at its lower end. The opposite end of the link 37 is attached to a plate valve 38 which is slidably mounted upon a pair of shafts 39 which are affixed to the hopper 26 at their inner ends as indicated at 40 and to a pair of brackets 41 attached to the outside of the hopper 26 as shown at 42. A spring 43 interconnects the link 36 and one side of the hopper 26.

Mounted upon the shaft 23 within the hopper 26 is a plurality of impeller or agitator blades 44. The hopper 26 has integrally formed therewith immediately below the valve plate 38 a distributing chute 45.

In operation, it will be seen that the hopper 26 is first filled with fertilizer or like material to be distributed whereupon the operator grasps the handles 11 and lifts the same in exactly the manner in which he would operate a wheelbarrow. When it is desired to distribute some of the contents of the hopper upon the ground, it is only necessary for the operator to bear inwardly with his fingers upon the handle 31 of the lever 30 to move the link 36 outwardly from the hopper 26 and thereby, through the connecting link 37, moving the valve plate 38 outwardly upon the shafts 39 thus allowing the material within the hopper to pass downwardly and out of the chute 45. In the interim, the motion of the wheel 19 as it rolls over the ground will cause the sprocket wheel 20 to move the chain 21 and consequently the sprocket wheel 22, thereby revolving the shaft 23 and the blades 44 which will act to agitate the material in the hopper and insure a continuous flow of the material to the chute. It will be seen that upon release of pressure upon the handle 31 the spring 43 will cause an immediate return of the link 36 to its original position and, consequently, a closing of the valve 38.

While but one form of the invention has been shown and described herein, it will be readily apparent to those skilled in the art that many minor modifications may be made without departing from the spirit of the invention or the scope of the appended claim.

What is claimed is:

A fertilizer distributor comprising a frame having side bars formed with handles at their rear ends, a wheel rotatably mounted between front ends of the side bars, a hopper mounted vertically between the side bars and being tapered downwardly and having a rearwardly disposed discharge spout at its lower end, shoulders extending transversely across inner faces of front and rear walls of the hopper, rods in downwardly spaced parallel relation to said shoulders having portions projecting outwardly through a horizontal slot formed in a side wall of the hopper above the discharge spout, a plate resting upon said rods with front and rear edge portions fitting between the rods and the shoulders and formed with depending flanges bearing against inner faces of front and rear walls of the hopper, said flanges and plate encompassing said rods, said plate constituting a valve for controlling flow of material in the hopper through the discharge spout and being slidable along the rods and through the slot to opened and closed positions, a lever extending longitudinally of said frame and pivoted to a bracket carried by one side bar for movement transversely of the said side bar, said lever extending forwardly at a downward incline and having its front end terminating between outer ends of said rods, and a connection between the valve plate and the front end of the lever causing movement of the valve plate to opened and closed position when the lever is tilted about its pivot.

FRED LONG.

REFERENCES CITED

The following references are of record in the file of this patent:

UNITED STATES PATENTS

| Number | Name | Date |
| --- | --- | --- |
| 16,617 | Thomason | Feb. 10, 1857 |
| 336,285 | Boswell | Feb. 16, 1886 |
| 348,862 | Pennal | Sept. 7, 1886 |
| 352,158 | Snyder | Nov. 9, 1886 |
| 479,551 | Bronson | July 26, 1892 |
| 800,847 | Herrick | Oct. 3, 1905 |
| 1,806,936 | Finnell | May 26, 1931 |
| 1,888,821 | Fearn | Nov. 22, 1932 |